United States Patent [19]

Schad et al.

[11] Patent Number: 5,133,655
[45] Date of Patent: Jul. 28, 1992

[54] FRICTION CLAMP FOR INJECTION MOLDING MACHINE

[75] Inventors: Robert D. Schad, Toronto; Victor Silaghi, Willowdale; Ronald Ing, Brampton, all of Canada

[73] Assignee: Husky Injection Molding Systems Ltd., Bolton, Canada

[21] Appl. No.: 637,814

[22] Filed: Jan. 7, 1991

[51] Int. Cl.⁵ .............................................. B29C 45/80
[52] U.S. Cl. ..................... 425/150; 425/171; 425/451.2; 425/590; 425/595
[58] Field of Search ............... 425/150, 589, 590, 595, 425/171, 451.2

[56] References Cited

U.S. PATENT DOCUMENTS

| | | | |
|---|---|---|---|
| 3,183,555 | 5/1965 | Siegel | 425/441 |
| 4,017,236 | 4/1977 | Penkman et al. | 425/150 |
| 4,158,327 | 6/1979 | Aoki | 425/590 |
| 4,230,442 | 10/1980 | Rees et al. | 425/150 |
| 4,443,179 | 4/1984 | Wohlrab | 425/590 |
| 4,571,169 | 2/1986 | Shima et al. | 425/589 |
| 4,605,367 | 8/1986 | Gutjahr | 425/150 |
| 4,744,740 | 5/1988 | Kojima | 425/590 |
| 4,846,664 | 7/1989 | Hehl | 425/589 |
| 4,904,177 | 2/1990 | Chiesi | 425/589 |

FOREIGN PATENT DOCUMENTS

| | | |
|---|---|---|
| 2174361 | 10/1973 | France . |
| 61-12316 | 1/1986 | Japan . |
| 1-245999 | 3/1988 | Japan . |
| 2-172711 | 12/1988 | Japan . |
| 1-49088 | 10/1989 | Japan . |
| WO8807447 | 10/1988 | World Int. Prop. O. . |

Primary Examiner—Tim Heitbrink
Attorney, Agent, or Firm—Bachman & LaPointe

[57] ABSTRACT

A friction clamp assembly for securing a mold of an injection molding machine in a closed position includes a column rigidly secured to a moving platen carrying a mold half and a gripper bush assembly for frictionally engaging and locking the column in a desired position. The clamp assembly further includes a clamp piston for clamping the moving platen in a mold closed position. The clamp assembly transmits a clamping force to portions of a moving platen other than end portions via the column so that platen parallelism is maintained during closing, injection and hold pressure portions of a molding cycle while platen bending is substantially avoided.

18 Claims, 4 Drawing Sheets

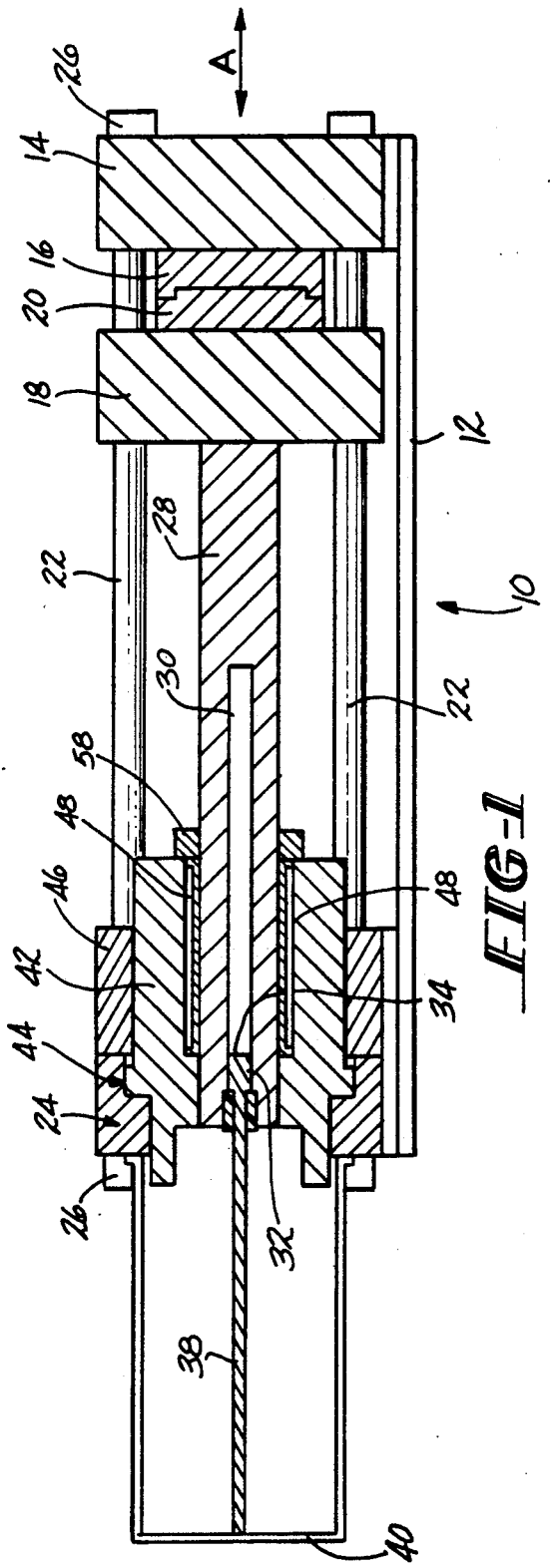
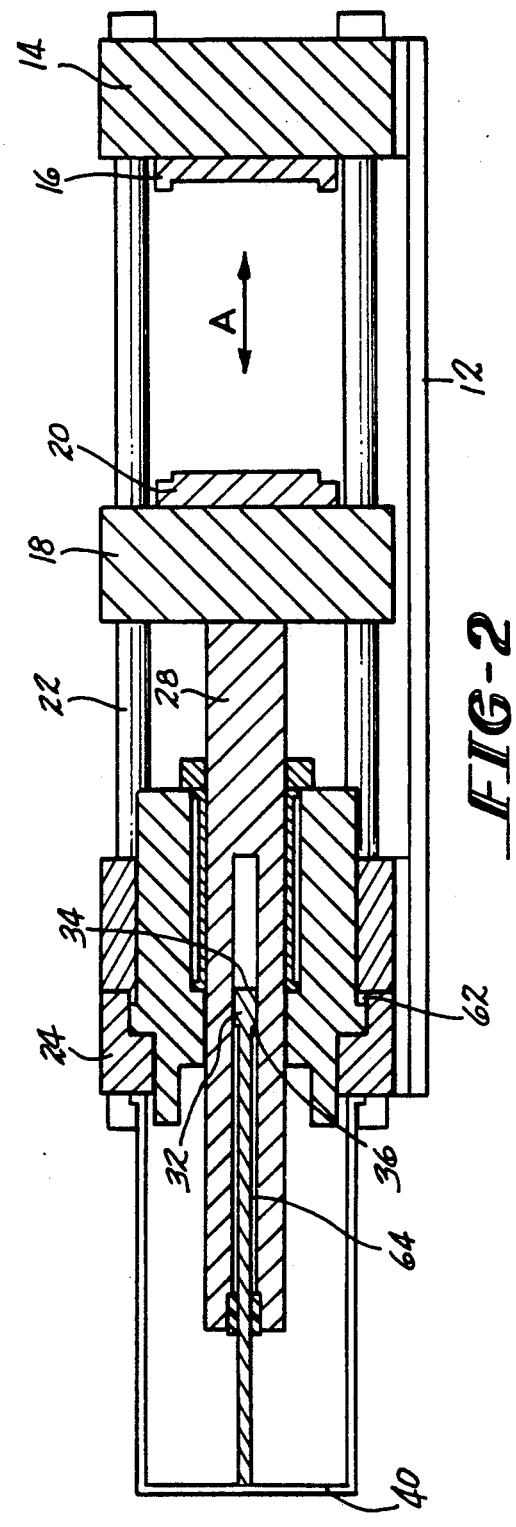

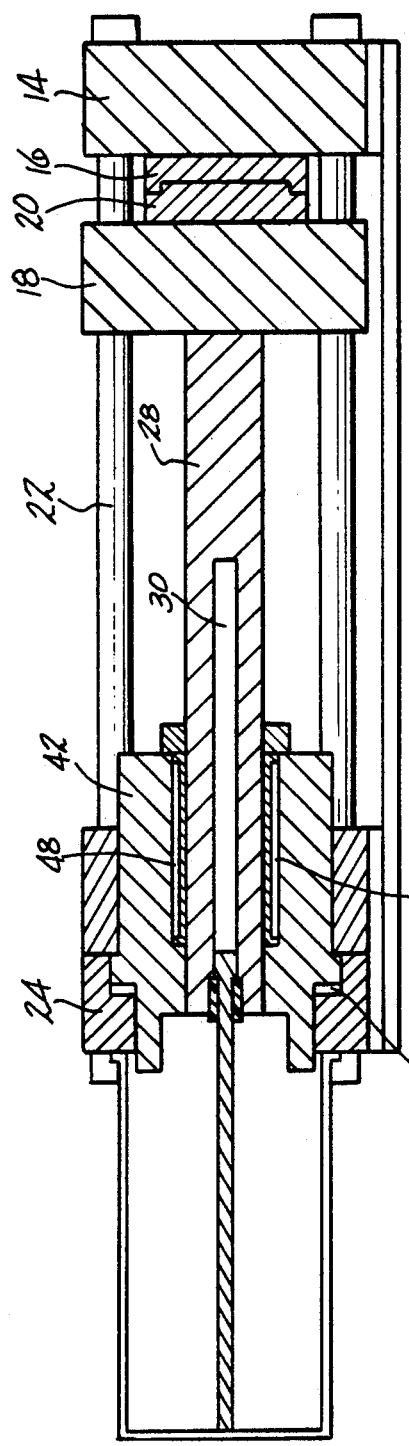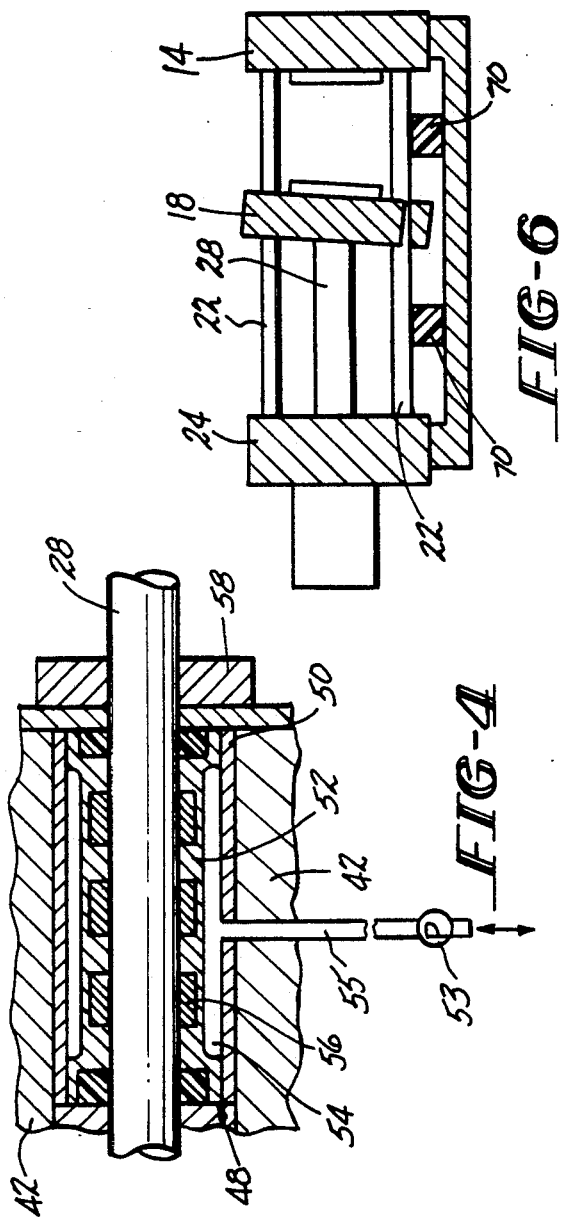

FRICTION CLAMP FOR INJECTION MOLDING MACHINE

BACKGROUND OF THE INVENTION

The present invention relates to an injection molding machine and in particular to a rapid-action mold closing and clamping arrangement for the molding machine.

Clamping mechanisms based on hydraulic actuation have been know for some time. They are preferred over mechanical toggle mechanisms in most cases because they can accommodate larger opening and closing strokes and impart their clamping force at the center of the moving platen rather than the edges, which promotes platen bending.

The design problems of hydraulic clamps are how to minimize the volume of oil to be moved and how to accommodate a wide range of mold shutheights and opening strokes in the same design. Obviously moving and compressing large volumes of oil requires time and energy to be consumed, both of which are counterproductive.

U.S. Pat. No. 4,443,179 to Wohlrab shows a mechanism that uses a small diameter cylinder to effect the opening and closing strokes of the moving platen, and a large diameter clamping cylinder to effect the clamping force transmitted to the mold. A large valve is used to allow the large volume of oil required in the clamp cylinder to enter rapidly during the closing stroke. The intent in this design is to speed up the filling and emptying of the main clamp cylinder by providing a large opening via the valve.

U.S. Pat. No. 4,605,367 to Gutjahr shows a similar feature. A large clamp cylinder is filled and emptied by means of large valves.

U.S. Pat. No. 4,744,740 to Kojima also shows a similar arrangement to the above without any attempt to minimize the volume of oil flow required to fill the clamp cylinder when the clamp closes.

U.S. Pat. No. 4,846,664 to Hehl shows a different approach to the same problem. The oil in a clamping cylinder is allowed to flow past a clamping piston during the opening and closing strokes which are effected by two outboard cylinders. The clamp piston is sealed to its rod by a sliding sleeve when clamp force is required.

U.S. Pat. No. 4,158,327 to Aoki also shows an arrangement allowing oil to flow past the clamp piston during clamp stroke motions. A valve closes off flow channels in the clamp piston when the clamp force must be developed. A small cylinder moves the main clamp piston through the opening and closing strokes.

Japanese patent number 61-12316 shows another way of doing the same thing. A clamp piston has flow channels which are opened or closed by a valve.

All the above devices have the following disadvantages:
(1) The clamp piston travels the same distance as the clamp closing stroke, subjecting the seals to accelerated wear. Since these seals are also subjected to high pressure clamping forces their service life is comparatively short;
(2) A large volume of oil must fill the clamp cylinder during the closing stroke and be compressed before the full clamp force can be generated. The movement of this large volume of oil is effected by providing large valves and using suction to move the oil rather than pumping. However the time and energy required to compress the oil prior to developing clamp force is considerable; and
(3) Moving large volumes of oil in and out of the clamp cylinder causes the oil to be heated by friction. This is detrimental to the oil which must be cooled using an intercooler. Again another waste of energy.

These disadvantages were largely addressed by a design know as a "shutter" clamp. The original versions of this design are shown in U.S. Pat. No. 4,017,236 to Penkman and U.S. Pat. No. 4,230,442 to Rees. In this design, a small cylinder performs the opening and closing stroke function. When the platen is in the mold closed position, "shutters" are moved to block the column and effectively transmit the clamp force developed by a set of pistons to the column and hence the moving platen and the mold. To open the clamp, the hydraulic pressure on the clamp pistons is released, the shutters are retracted and the small cylinder pulls the moving platen open. The column passes inside the hollow clamping pistons as it retracts, thus reducing the length of the overall assembly.

The advantages of this design is that only small volumes of oil are moved and pressurized and that the clamp piston seals travel a very short distance on each cycle. This reliable, fast acting, energy efficient, hydraulic clamp was further developed by incorporating the clamp stroking cylinder inside the clamp arrangement to further shorten the assembly. This is shown in a brochure dated "1981" published by the assignee of the instant application.

The disadvantage of this arrangement is that the time taken for the shutters to move penalizes the clamp speed slightly.

A third approach uses a clamp closing mechanism which grips the tiebars of the machine prior to the clamping force being developed. U.S. Pat. No. 3,183,555 to Siegel illustrates a system having hydraulically activated "gripper" bushings which grip the tiebars when the mold is closed. Each tiebar is fitted with a clamping cylinder which when activated pulls the tiebars and the "gripped" moving platen toward the stationary platen, effectively clamping the mold. Opening and closing of the mold is effected by a piston and cylinder connected to the moving platen. A similar system is shown in French Patent No. 2,174,361 to Guerin.

Japanese Published Patent Appliction No. 1-245,999 to Kenji et al. illustrates a verticle pressing device having a movable element connected at its edges to a plurality of supporting shafts. A clamp mechanism is provided at each corner of the device to ensure a proper degree of compression. Each clamping mechanism has a flexible sleeve for gripping one of the supporting shafts when it is held against the supporting shaft by means of hydraulic pressure. A clamping or compressive force is applied to each shaft by a piston-cylinder arrangement. The flexible sleeve for gripping the shaft forms part of the piston. Position-detecting sensors may be provided to detect the position of the movable frame on each of the supporting shafts. The fluid pressure in piston-cylinder may then be adjusted to maintain the movable frame and the fixed frame in a parallel relationship.

Japanese Patent No. 1-49088 and Japanese Published Patent Application No. 2-172,711 to Nakagawa et al. each illustrate a friction clamp mold-fastening device for a mold. The mold-fastening device comprises a plurality of piston-cylinder arrangements within the four corners of the moving platen. Each double-acting piston has an inner wall formed by a flexible sleeve for gripping a tiebar along which the platen moves. A clamping force is applied to the mold in a closed position, after the tierods have been gripped by the respective flexible sleeves, by applying a fluid pressure within the cylinder which causes the piston to move toward the fixed platen. The flexible sleeve in the Nakagawa et al. application has a threaded portion which joins it to the supporting shaft portion of the piston.

The principal disadvantage of these arrangements has been that the clamping force is delivered to the corners of the moving platen. The application of the clamping force at the corner causes the platen to bend, particularly if the clamping force at one corner is greater than that applied at another corner. The result is that the mold is unevenly clamped.

Still further, these prior art systems grip the tiebars when they are in a relaxed state and then apply a clamping force which causes stretching of the tiebars or supporting shafts. This stretching must be physically accommodated. The way it is accommodated is either by the gripper bushing relaxing and allowing the tiebar to slip or by the gripper bushing stretching with the tiebar. In the former situation, the clamping forces being applied through the gripper bushing decreases. In the latter situation, the stretching of the flexible wall of the gripper bushing is resisted by the ends of the piston assembly to which it is attached. Ultimately, the bushing fails entirely as a result of stresses building up in its end portions. For those systems where the flexible wall of the bushing has threads which engage mating threads on a support structure, a fretting action occurs in which the threads are deformed. Ultimately, the distribution of forces over the piston becomes non-uniform, the flexible wall of the bushing wears and corrodes.

A newer version of this principle is shown in U.S. Pat. No. 4,571,169 to Shima. Tiebar clamping cylinders push an intermediate frame against a rotary shutter causing columns to be pushed against a moving platen and clamp the mold against the stationary platen. A limited range of shutheights is available with this machine as the clamping piston has a limited stroke inside the cylinder.

While Shima clamps the platen in its center overcoming the bending problem, it has a time penalty caused by waiting for the shutter to move twice on each cycle. An additional disadvantage is the limited range of mold shutheights. Even in the arrangement shown, the volume of oil to be compressed in each clamping cylinder is becoming large. Increasing the length of the cylinder to allow a larger range of mold shutheights would worsen this disadvantage.

SUMMARY OF THE INVENTION

It is an object of the present invention to provide an improved mold clamping apparatus for an injection molding machine.

It is a further object of the present invention to provide an apparatus as above which is reliable, fast acting and energy efficient.

It is still a further object of the present invention to provide a clamp apparatus as above which is capable of reducing clamp dry cycle time by 5-10%.

It is yet a further object of the present invention to provide a clamp apparatus as above which is cheaper to construct and less costly to maintain.

It is yet another object of the present invention to provide a clamp apparatus as above which maintains platen parallelism during closing, injection and hold pressure portions of the molding cycle while substantially avoiding platen bending.

These and other objects and advantages will become more clearer from the following description and drawings in which like reference numerals depict like elements.

An injection molding machine in accordance with the present invention has a stationary platen with a first mold half affixed thereto, a moving platen having a second mold half affixed thereto, and means for reciprocatingly moving the moving platen between a mold open and a mold closed position. The machine further has means for clamping the moving platen in the mold closed position in a manner which maintains platen parallelism while substantially avoiding platen bending.

The clamping means includes means for frictionally engaging a portion of a column fixed to the moving platen and locking the column in a fixed position. The frictional engaging and locking means preferably comprises a gripper bush assembly for engaging said column portion. The clamping means further includes a fluid actuated clamp piston for applying a clamping force to the mold via the column. This clamping force is transmitted through the column while the column is under compression. In this way, the stretching problems of the prior art systems are avoided.

In one embodiment of the present invention, a plurality of columns are affixed to the moving platen. In this embodiment, a gripper assembly is provided for engaging each of the columns. The gripper assemblies may be individually operated so that a higher pressure may be applied to a portion of the moving platen which lags behind other portions.

Further details of the present invention are set out in the following description.

BRIEF DESCRIPTION OF THE DRAWINGS

FIG. 1 is a schematic sectional view of an injection molding apparatus with a clamping arrangement in the mold closed and unclamped position.

FIG. 2 shows the apparatus of FIG. 1 in the mold open position.

FIG. 3 shows the apparatus of FIG. 1 in the mold closed and clamped position.

FIG. 4 illustrates a gripper bush assembly with built-in friction pads.

FIG. 6 illustrates an embodiment of an injection molding machine having lower tiebars supported by support blocks.

DETAILED DESCRIPTION

Figure 5:
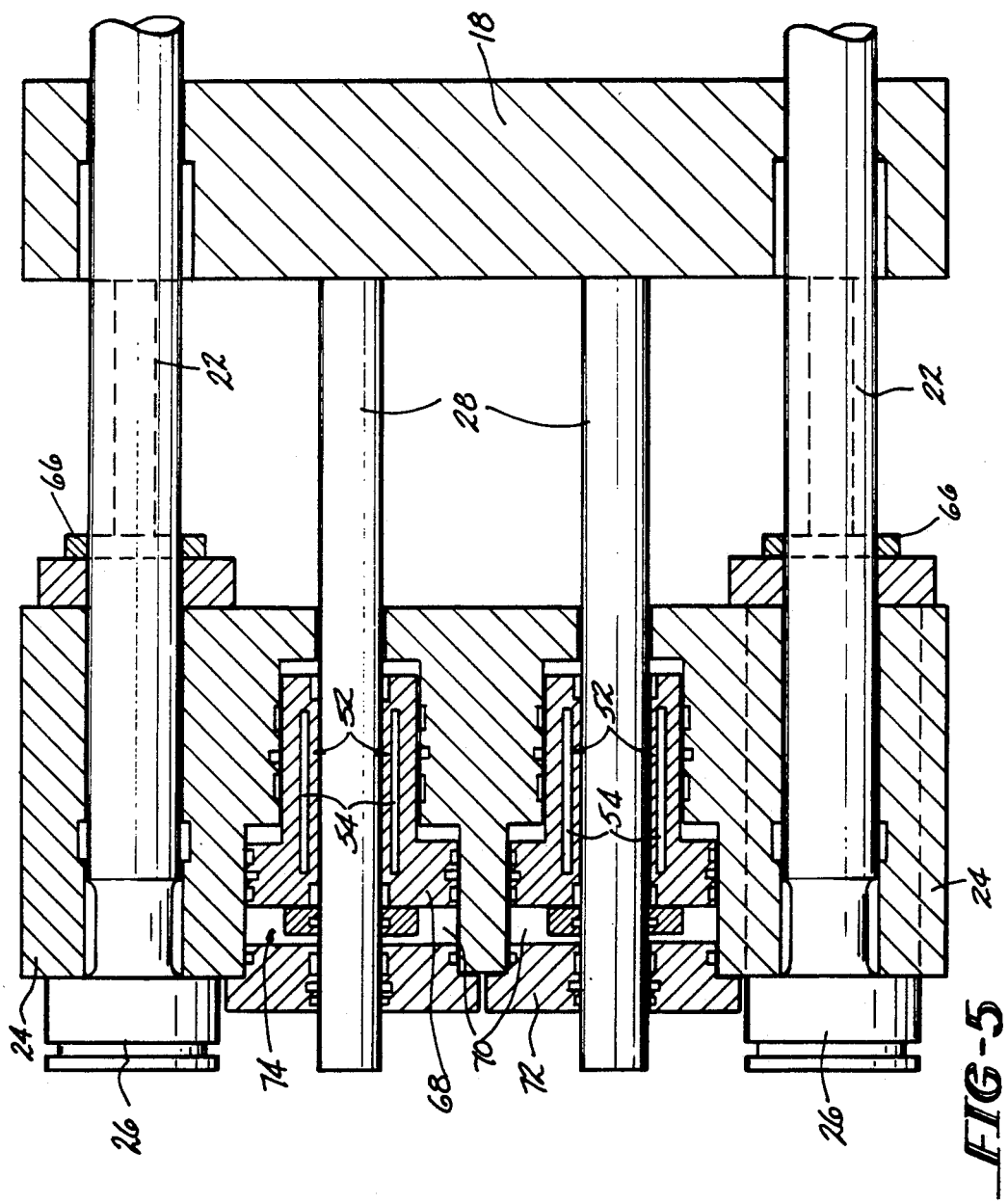
FIG. 5 illustrates an alternative embodiment of an injection molding machine in accordance with the present invention.

Referring now to the Figures, an injection molding machine 10 in accordance with the present invention has a frame 12 with a stationary platen 14 secured in a fixed position. The stationary platen 14 has a first mold half 16 such as a cavity half affixed thereto.

The injection molding machine further includes a moving platen 18 having a second mold half 20 such as a core half secured thereto. The moving platen slides along a plurality of tiebars 22 secured to the stationary platen 14 and a clamp block 24 by tiebar nuts 26. The moving platen 18 moves along the axis A between a mold open and a mold closed position.

In the embodiment of FIGS. 1-3, movement of the moving platen 18 between the mold closed and mold open positions is effected via a column 28 rigidly and fixedly mounted to a central portion of the platen 18. The column 28 extends substantially parallel to the tiebars 22 and the axis A.

The column 28 has a hollow portion defining a clamp stroke cylinder 30. A piston 32 having opposed faces 34 and 36 is positioned within cylinder 30. The piston is secured in a fixed position by a cylinder rod 38 rigidly fastened to a clamp structure 40 mounted to the clamp block 24. When a fluid such as hydraulic oil is pumped into the cylinder 30 in the space bordered by face 34, the fluid causes the moving platen 18 to move so as to close the mold. When fluid is pumped into the cylinder 30 in the space bordered by face 36, the fluid causes the moving platen 18 to move so as to open the mold. Any suitable arrangement of valves, pumps, conduits and the like (not shown) known in the art may be used to pump fluid into and out of the cylinder 30.

A clamp piston 42 is mounted inside a clamp cylinder 44 defined by the clamp block 24 and a front plate 46. A gripper bush assembly 48 is preferably mounted to an internal surface of the piston 42. The gripper bush assembly allows the column 28 to slide freely when it is inactive or to be gripped or locked in a fixed position, e.g., the mold closed position, when it is activated.

The gripper bush assembly, as shown in FIG. 4, has a base portion 50, a flexible inner wall structure 52 and a chamber 54 intermediate the base 50 and the wall 52. Preferably, the gripper bush assembly and the flexible wall 52 extends about the circumference of the column 28 and along the majority of the column length that is within clamp piston 42. High pressure fluid such as pressure oil may be pumped into the chamber 54 via conduit 55 and pump 53 so as to cause the wall 52 to expand radially inwardly and frictionally engage the exterior surface of column 28, thus locking the column 28 in a fixed position.

The flexible inner wall structure 52 for gripping and locking the column 28 may be formed from any suitable material known in the art, such as brass, steel, plastic, rubber or the like. If desired, one or more friction pads 56 made of plastic, brass or a material similar to brake linings may be set in the wall 52 to frictionally engage and grip the column 28 when the wall 52 is deflected by fluid pressure.

The gripper bush assembly 48 is maintained in place by a retaining plate 58 mounted to the piston 42. The plate 58 may be mounted to the piston 42 using any suitable means known in the art.

In the clamping apparatus of the present invention, the gripper bush assembly 48 is activated by pumping a fluid, i.e., oil, under high pressure, typically about 6,000 psi, into the chamber 54 causing the wall 52 to deflect and grip the outer periphery of the column 28. The assembly 48 is activated after the mold has been closed by action of the piston 32 and the cylinder 30.

After the column is quickly gripped by the assembly 48, the clamp piston 42 is activated by directing high pressure fluid such as oil into the chamber 60 shown in FIG. 3. Fluid may be introduced into the chamber 60 using any desired arrangement of conduits, valves, pumps or the like (not shown) known in the art. This action of the piston 42 applies a clamping force to the platen 18 via the clamped column 28 to clamp the mold in its closed position. The clamping force is advantageously applied to the center portion of the platen 18 so as to maintain platen parallelism during mold closing, injection and hold pressure portions of the molding cycle while substantially avoiding platen bending. As previously discussed, clamping forces applied to the edges or corners of the moving platen cause the platen to deflect and bend. By applying the clamping force in central portions of the platen, the force is distributed in such a way that platen bending is avoided.

Another advantage of the present invention is that the clamping force is applied to the platen via the column while the column is in compression. As a result, the problems of gripper bushing wear, clamping assembly corrosion and clamping force losses encountered by the prior art systems are avoided.

Opening the mold is achieved by first releasing the clamp pressure caused by piston 42. This is done by releasing fluid from the chamber 60. The mold is then "broke open" by directing a high pressure fluid into the chamber 62 causing the piston 42 to move to a release position. Thereafter, the gripping bush assembly 48 is released by withdrawing fluid from the chamber 54 via conduit 56. Pressurized fluid is then directed into the chamber 64 defined by the cylinder 30 and piston face 36 causing the column 28 and the moving platen 18 to retract.

The foregoing arrangement maintains the advantages of the earlier shutter type clamp while overcoming its disadvantage of time lost for shutter actuation. This is because the actuation of the gripper bush is very fast since there is no mechanical motion of parts. A reduction in clamp dry cycle time of 5-10% is estimated. In addition, this arrangement is cheaper to build and less costly to maintain as there are less parts.

Referring now to FIG. 5, another embodiment of an injection molding machine incorporating the present invention is illustrated. The machine 10 has a moving platen 18 sliding on tiebars 22 which in turn are fixed between a stationary platen not shown and a clamp end block 24. External cylinders 66 are used to reciprocate the moving platen 18 between the mold open and mold closed positions. A plurality of columns 28, e.g., two or four columns, extend from the moving platen through clamp end block 24 and through gripper piston assemblies 68 to guide the platen 18 as it moves back and forth between the mold open and mold closed positions.

The gripper piston assemblies 68 are positioned inside cylinders 70 bored in the clamp end block 24. Each cylinder is closed by an end cap 72. One piston assembly is provided for each column 28.

The gripper piston assemblies 68 each include a flexible wall structure 52 and a chamber 54. As before, the flexible wall structure 52 moves radially inwardly when the chamber 54 is filled with high pressure fluid to grip the column 28 and lock it in a desired position. To clamp the moving platen in the mold closed position, high pressure fluid is introduced into the chamber 74 which causes the piston 68 to push against the moving platen 18 and applying a clamping force to the platen 18 via the columns 28. In this system, the clamping force is applied to portions of the platen 18 other than platen end portions. This helps maintain platen parallelism while substantially avoiding platen bending. The clamping force is also applied while the columns are in a state of compression, avoiding the problems of premature wear of the gripper assembly and flexible sleeve and loss of clamping power.

It has been found that the same high pressure oil, typically at 6,000 psi, used to energize the gripper bushing assembly portions of the piston can also be used to exert the clamping pressure. As a result, the diameter of the gripper piston can be considerably smaller than conventional clamping pistons operating at lower oil pressures of 2,150 psi.

As discussed above, one of the goals in designing a molding machine is to maintain platen parallelism at all times. Platen parallelism is desirable in order to ensure that the mold closes uniformly and is held closed uniformly during injection and packing. When platen parallelism is maintained, more dimensionally accurate parts are molded and mold wear is reduced. Some prior art horizontal machines use very thick platens in an attempt to reduce platen deflection and loss of parallelism. The greater mass of these platens however increases wear on the sliding surfaces, increases cost and reduces cycle time since greater inertia forces have to be handled.

In some machines where the moving platen slide horizontally, either along tiebars or the ways of the base means, the weight of the platen creates friction between the sliding surfaces. If the tiebars are unsupported and the platen does not slide on ways then the friction should be equally distributed between the four tiebar bushings in the moving platen and will only vary because of tolerance variations between the individual bushings and the tiebars. However, if the lower tiebars 22 are supported by support blocks 76, as shown in FIG. 6, to minimize platen sag due to tiebar bending, the lower tiebars will carry a greater weight than the upper tiebars since they do not deflect as much as the unsupported upper tiebars. Consequently, the friction forces will be higher on the lower tiebar bushings, causing the platen 18 to tend to stick along its lower edge. This in turn causes the top of the platen 18 to tip toward the stationary platen 14. If the lower surface of the platen 18 slides on ways, these too will impart greater friction to the lower surface causing tipping.

Figure 7:
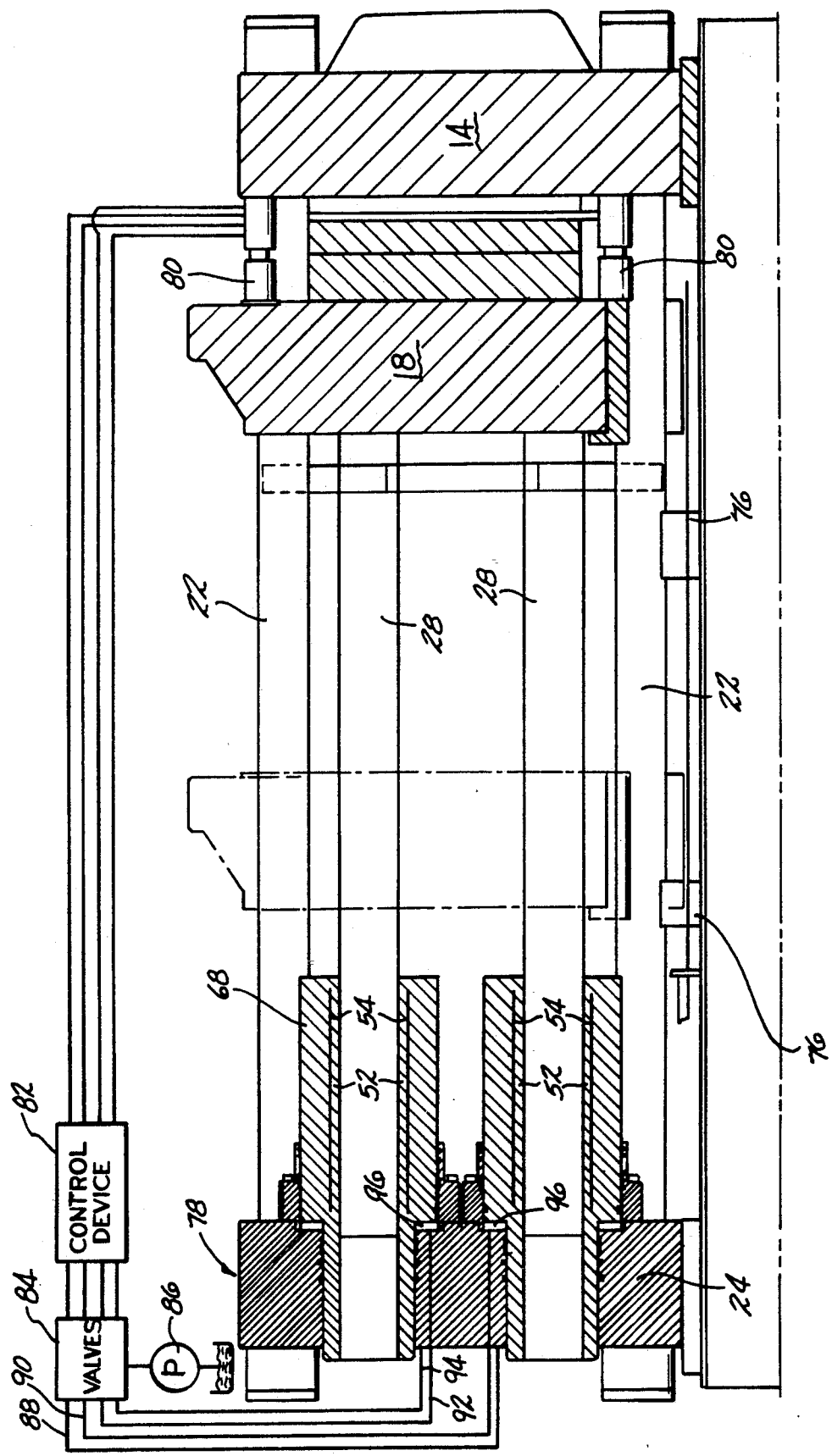
FIG. 7 illustrates a clamping arrangement for an injection molding machine wherein fluid pressure applied to each clamp assembly may be varied.

FIG. 7 illustrates yet another embodiment of the present invention. As before, the molding machine includes a stationary platen 14 and a moving platen 18 which slides along tiebars 22. The lower pair of tiebars are supported by blocks 76. An external device (not shown) such as that shown in FIG. 5 may be used to move the platen 18 between a mold open and a mold closed position.

Four columns 28 for guiding movement of the platen along the axis A are attached to the platen 18. As before, a clamping assembly unit 78 is provided which includes a clamp block 24 and a gripper piston assembly 68 for each column 28. Each gripper piston assembly 68 is held within the clamp block 24 by a sleeve portion 69 and includes a flexible wall 52 and a chamber 54 which can be filled with a fluid under pressure. When the chamber 54 is filled with said fluid, the wall 52 moves radially inwardly to contact and grip a respective column 28.

In addition to gripping the columns 28, the clamping assembly is used to apply a clamping force to the moving platen via the columns 28. As before, the clamping force is transmitted along the columns while the columns are being compressed. To promote platen parallelism during closing, injection and hold pressure, a system is provided for varying the clamp force applied to different portions of the platen. This system includes a position/velocity detection sensor 80 at each platen corner and a control device 82. The sensor 80 may be any suitable sensor known in the art.

The control device 82 receives as inputs signals such as digital electronic signals from each of the sensors 80. The device 82 may be a preprogrammed computer for generating an output signal which maintains the platen faces parallel for a particular set of operator set points and the input signals. The device 82 determines the amount and rate of change in oil pressure which needs to be supplied to the respective clamping units 78 for maintaining platen parallelism. The output of the control device 82 controls individual hydraulic valves in the valve bank 84 which are each supplied with fluid under pressure by the pump 86. An individual supply line 88, 90, 92 and 94 extends from each valve in the valve bank 84 to a fluid chamber 96 in a respective clamping unit 78.

The sensors indicate to a user whether one portion of the moving platen is lagging behind. If it is, fluid at a higher pressure supplied to the chamber 96 of the respective clamping unit. This results in a higher clamping force being applied to that portion of the moving platen. In this way, platen parallelism is maintained.

The control device 82 may also comprise any suitable control circuit or other control means known in the art.

The clamping apparatuses of the present invention are believed to have utility in a wide range of injection molding machines for manufacturing a wide variety of plastic articles.

While a particular type of gripper bush assembly has been described above, it should be realized that other types of gripper bush assemblies may be utilized. For example, the gripper bush assembly may be that described and shown in co-pending U.S. Pat. application Ser. No. 577,308, filed Sep. 4, 1990, assigned to the assignee of the present invention, which is hereby incorporated by reference herein.

It is apparent that there has been provided in accordance with this invention a friction clamp for an injection molding machine which fully satisfies the objects, means and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding machine comprising:
   a stationary platen having a first mold half affixed thereto;
   a moving platen having a second mold half affixed thereto, said moving platen travelling along a plurality of tiebars;
   means for reciprocatingly moving said moving platen between a mold open and a mold closed position;
   means for applying a clamping force to said moving platen in said mold closed position so that platen parallelism is maintained during closing, injection and hold pressure portions of a molding cycle while substantially avoiding platen bending;
   said clamping force being applied to said moving platen via said reciprocating means while at least a portion of said reciprocating means is in compression so as to substantially avoid clamping force losses;

said clamping means including means for frictionally engaging said reciprocating means and locking said reciprocating means in a fixed position; and said frictional engaging means permitting a reduction in mold cycle time losses because actuation of the frictional engaging means occurs without mechanical motion.

2. The injection molding machine of claim 1 wherein:

said reciprocating means includes a column rigidly mounted to said moving platen intermediate said tiebars, said column transmitting said clamping force to said moving platen in a region other than an end region of said moving platen so as to substantially avoid bending of said moving platen.

3. The injection molding machine of claim 2 further comprising:

a piston and cylinder arrangement within said column for causing said reciprocating movement of said moving platen between said mold open and mold closed positions;

said piston being mounted in a fixed position relative to said stationary platen; and said cylinder being defined by an internal chamber within said column.

4. The injection molding apparatus of claim 2 further comprising comprising:

said clamping force applying means including a clamp block;

said tiebars extending between said stationary platen and said clamp block; and said column extending substantially parallel to said tiebars.

5. The injection molding machine of claim 2 wherein said clamping force applying means further includes:

a clamp cylinder spaced at a fixed location from said stationary platen;

a clamp piston positioned inside said clamp cylinder;

said clamp piston being movable between a mold clamped position and a mold unclamped position; and whereby a clamping force is transmitted to said moving platen via said column while said column is in a state of compression.

6. The injection molding apparatus of claim 5 further comprising:

said friction engaging and locking means being secured to an interior surface of said piston and being retained in a desired position by a plate mounted to said piston.

7. The injection molding machine of claim 1 wherein:

said reciprocating means includes a column rigidly mounted to a central portion of said moving platen so as to facilitate the application of said clamping force while substantially avoiding bending of said moving platen; and said friction engaging and locking means comprises a fluid actuated gripper bush assembly having a flexible wall which under fluid pressure deflects radially inwardly to frictionally engage an outer surface of said column.

8. The injection molding machine of claim 7 wherein said flexible wall includes a series of spaced apart friction pads for frictionally engaging said outer surface.

9. The injection molding machine of claim 8 wherein said friction pads are formed from a metallic material.

10. The injection molding machine of claim 8 wherein said friction pads are formed from a plastic material.

11. An injection molding machine comprising:

a stationary platen having a first mold half affixed thereto;

a moving platen having a second mold half affixed thereto, said moving platen travelling along a plurality of tiebars;

means for reciprocatingly moving said moving platen between a mold open and a mold closed position;

means for applying a clamping force to said moving platen in said mold closed position so that platen parallelism is maintained during closing, injection and hold pressure portions of a molding cycle while substantially avoiding platen bending;

said tiebars extending between said stationary platen and a clamp end block;

said reciprocating means including at least two columns, said columns transmitting said clamping force to said moving platen at a location other than an end region of said moving platen while said columns are in compression so as to substantially avoid clamping force losses;

each said column being rigidly and fixedly secured to said moving platen and extending substantially parallel to said tiebars;

said clamping means including means for frictionally engaging said columns and locking said columns in a fixed position;

said frictionally engaging and locking means comprising at least two clamping and gripper assemblies for gripping said at least two columns and thereby transmitting said clamping force to said moving platen; and said frictionally engaging and locking means enabling a reduction in mold cycle time losses because actuation of the frictionally engaging and locking means occurs without mechanical motion.

12. The injection molding machine of claim 11 further comprising:

each said gripper assembly comprising a piston structure having a bore through which one of said columns passes and a flexible wall structure for frictionally engaging an outer surface of the one column passing through said bore.

13. The injection molding machine of claim 12 further comprising:

each said clamping and gripper assembly including a bore within said clamp end block defining a clamping cylinder;

said piston structure of each assembly being positioned within said clamping cylinder, whereby when each said cylinder is filled with a high pressure fluid and each said clamping and gripper assembly engages said columns, each said piston assembly pushes against said moving platen and transmits said clamping force to said mold.

14. The injection molding machine of claim 11 further comprising:

a control system for applying different clamping forces to different portions of said moving platen to maintain said platen parallelism during said closing, injection and hold pressure portions of the molding cycle.

15. The injection molding machine of claim 14 wherein said control system comprises:

control means for applying fluid at a desired pressure to each clamping and gripper assembly;

said control means including a sensor positioned at each corner of said moving platen to measure at least one of platen position and platen velocity;

said control means including a bank of valves; and each valve in said bank communicating with a respective one of said assemblies.

16. The injection molding machine of claim 15 wherein each said valve is separately operable so that fluid may be applied to one clamping and gripper assembly at a pressure higher than that of fluid being applied to a second clamping and gripper assembly.

17. An injection molding machine comprising:

a frame;

a stationary platen fixedly secured to said frame;

said stationary platen having a first mold half secured thereto;

a clamp block secured to said frame;

a plurality of tiebars extending between said stationary platen and said clamp block;

a moving platen having a second mold half secured thereto, said moving platen being movable along said tiebars;

a piston and cylinder arrangement for moving said moving platen between mold open and mold closed positions;

said piston and cylinder arrangement comprising a stationary piston fastened to said clamp block via a clamp structure and a cylinder rod;

said piston and cylinder arrangement further comprising a cylinder defined by a hollow chamber in a column attached to a central portion of said moving platen;

said piston being positioned within said chamber; and means for clamping said moving platen in said mold closed position, said clamping means comprising at least one gripper bush assembly for frictionally engaging said column and a fluid actuated clamping piston housed within a cylinder defined by said clamp block for transmitting a clamping force to said central platen portion via said column while said column is being compressed by action of said clamping piston so as to substantially avoid platen bending.

18. The injection molding machine of claim 17 further comprising:

said at least one gripper bush assembly being mounted to an interior surface of said clamping piston and being retained in place by a plate mounted to said clamping piston.

* * * * *